Nov. 7, 1967  A. R. SAMMARCO  3,351,183
COMBINATION SHIPPING AND DISPLAY CARTON
Filed Oct. 24, 1965  4 Sheets-Sheet 1
FIG. 1
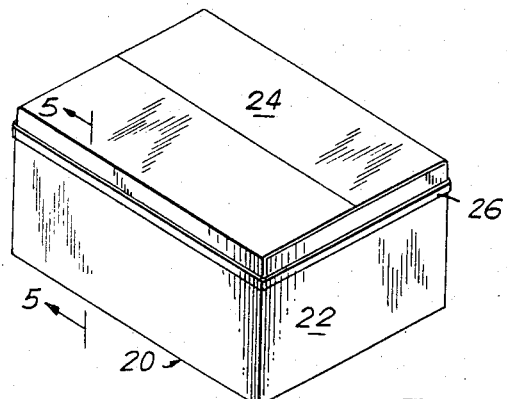
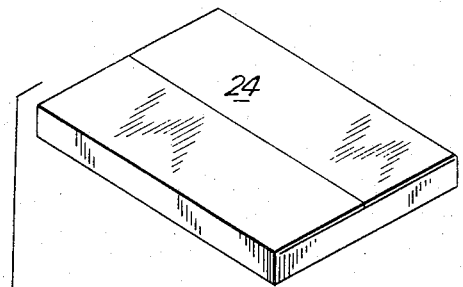
FIG. 2
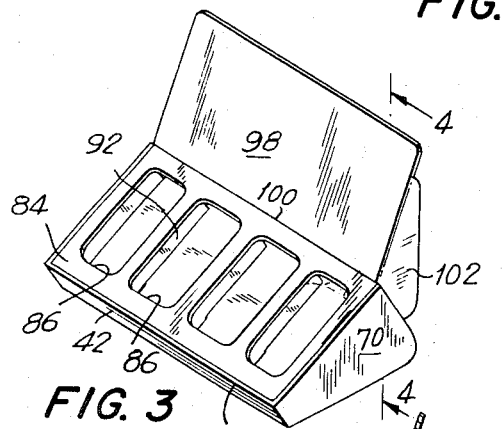
FIG. 3
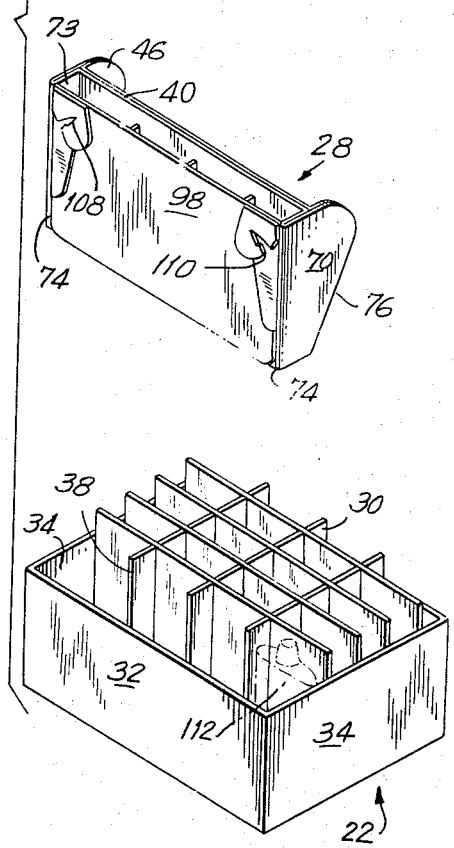
FIG. 4
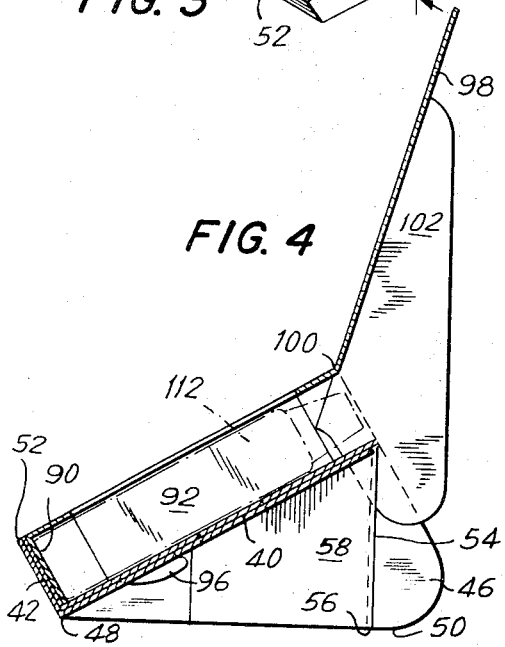
INVENTOR.
ALFRED R. SAMMARCO
BY
Blum, Moscovitz, Friedman, Blum & Kaplan
ATTORNEYS

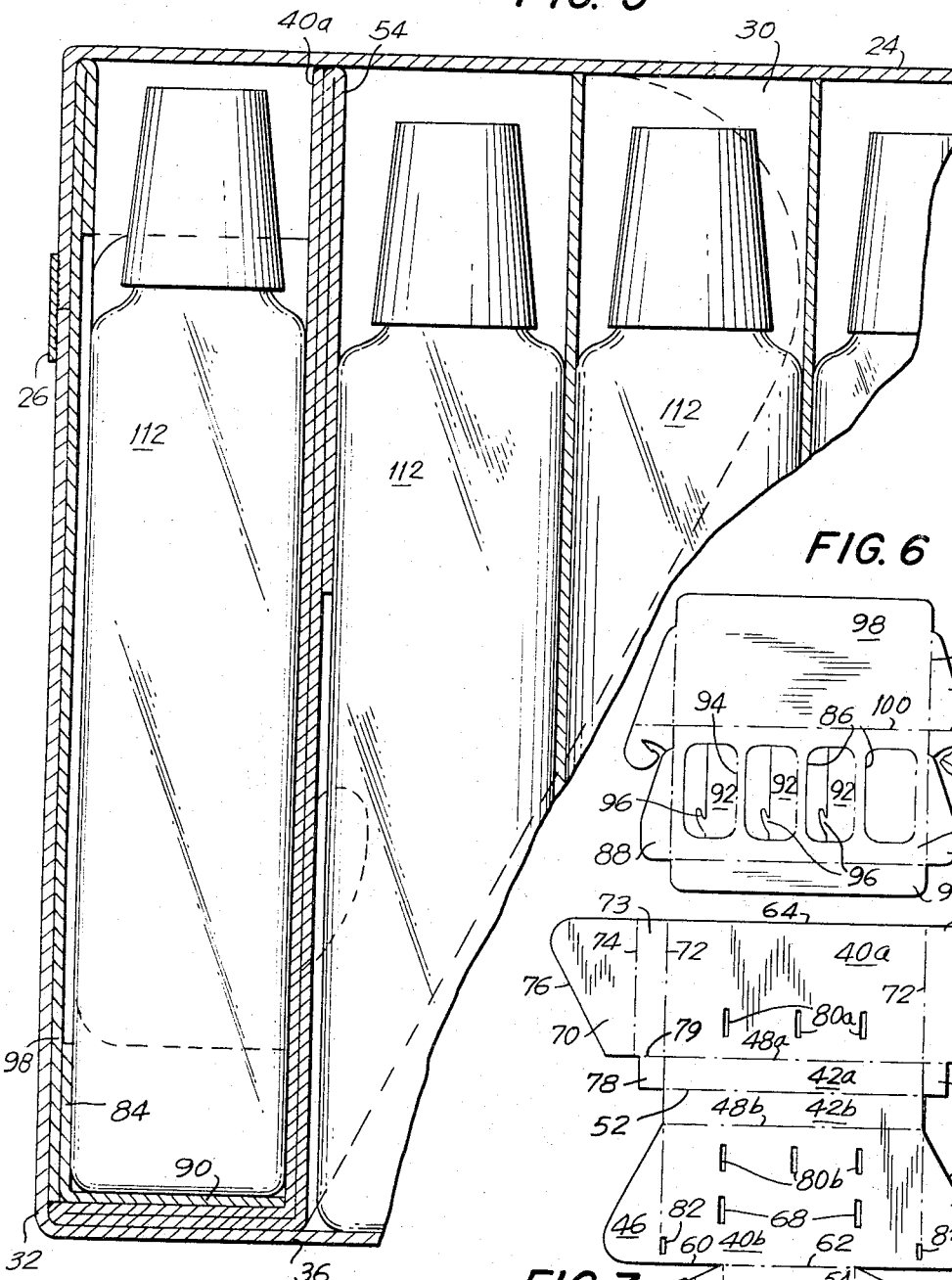
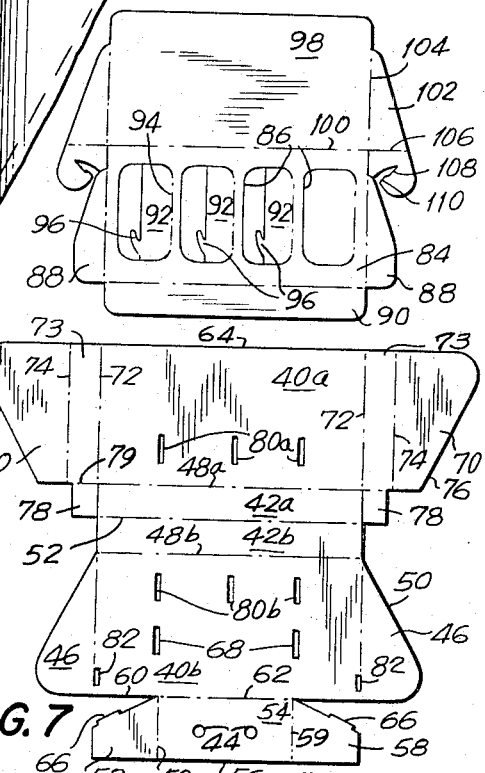

Nov. 7, 1967  A. R. SAMMARCO  3,351,183
COMBINATION SHIPPING AND DISPLAY CARTON
Filed Oct. 24, 1965  4 Sheets-Sheet 3

INVENTOR.
ALFRED R. SAMMARCO
BY
Blum, Moscovitz, Friedman Blum & Kaplan
ATTORNEYS

Nov. 7, 1967 A. R. SAMMARCO 3,351,183
COMBINATION SHIPPING AND DISPLAY CARTON
Filed Oct. 24, 1965

INVENTOR.
ALFRED R. SAMMARCO

United States Patent Office 3,351,183
Patented Nov. 7, 1967

3,351,183
COMBINATION SHIPPING AND DISPLAY CARTON
Alfred R. Sammarco, Yonkers, N.Y., assignor to Schenley Industries, Inc., New York, N.Y., a corporation of Delaware
Filed Oct. 24, 1965, Ser. No. 511,576
20 Claims. (Cl. 206—44)

ABSTRACT OF THE DISCLOSURE

A shipping and display structure for articles which are to be shipped or transported and which are to be placed on display when the articles arrive at their destination. A shipping carton is provided with a bottom wall and a plurality of side walls which extend upwardly therefrom, and within this carton is located a partition structure which divides the interior of the carton into a plurality of compartments which are respectively adapted to receive the articles which are to be transported and displayed. This partition structure terminates short of one of the side walls of the carton while extending substantially all the way across the carton between a pair of opposed side walls thereof which extend from the latter one side wall, and the partition structure defines in the interior of the carton not only compartments for articles but in addition it provides a row of compartments which have open ends directed toward the above-mentioned one side wall up to which the partition structure does not extend. Between the partition structure and the one side wall up to which it does not extend is situated a display structure which in and of itself supports at least some of the articles during shipment thereof within the carton. This display structure closes the open ends of the row of compartments which are directed toward the one wall up to which the partition structure does not extend, and when the carton reaches its destination the display structure can be removed from the carton with the articles which are carried by the display structure so that the latter articles can then be placed on display with the display structure when it arrives at its destination.

---

The present invention relates to devices for accommodating articles both during shipment and for display purposes.

While it is already known in general to provide specially constructed containers in which articles can be shipped and in which, by suitable manipulation of the containers, the articles can be displayed when they arrive at their destination, these known structures have serious disadvantages. When dealing with articles which can be shipped in relatively large numbers in a single container, for example, if the latter container is used for display purposes then of course the entire contents of the container remain therein and the entire display takes up far too much space. On the other hand, it is impractical to provide a separate container for a number of articles small enough to be displayed conveniently when the articles arrive at their destination, and up to the present time there has been no satisfactory solution to this problem of satisfying on the one hand the requirement of shipping a relatively large number of articles in a single shipping carton, for example, while at the same time having available at the destination to which the articles are shipped a convenient display device capable of displaying a reasonable number of articles necessarily substantially less than the number which can conveniently and practically be shipped at one time in a single container.

It is therefore a primary object of the present invention to provide a solution to the above problem.

In particular it is an object of the invention to provide a display device which can readily be incorporated into and form part of a shipping carton while at the same time being separable therefrom at the point of destination so as to be available for display purposes with a fraction of the number of articles located in the entrie shipping carton.

A further object of the invention is to provide a display device which will occupy very little additional space, if any, in the interior of a shipping carton, beyond the space which would in any event be required for proper packing of the articles.

Furthermore, it is an object of the invention to provide a display device which when it is in the shipping carton serves the additional function of accommodating articles and protecting them during shipment thereof.

An additional object of the invention is to provide a display device which can very quickly and conveniently be removed from a shipping carton together with objects which are to be displayed and set up for display purposes in an extremely rapid and convenient, easy manner.

Furthermore, it is an object of the invention to provide a display device which while capable of displaying articles prevents them from being removed from the front of the display device.

Also, the objects of the present invention include the provision of a device of the above type which can conveniently be made very inexpensively from a sheet material such as cardboard.

Primarily, with the structure of the present invention the display device will include a back wall and a bottom wall projecting forwardly from the back wall at a bottom edge thereof. This bottom edge of the back wall forms a rocking edge about which the display device can be rocked between a shipping position and a display position. The display device includes end walls which project rearwardly from the back wall and terminate in free edges adapted to rest together with the rocking edge on a suitable supporting surface with the back and bottom walls situated over and spaced from the supporting surface in order to place the display device in its display position. When the display device is in its shipping position it is in the interior of a shipping carton with the bottom wall of the display device situated directly over and engaging the bottom wall of the shipping carton.

The invention is illustrated by way of example in the accompanying drawings which form part of the application and in which:

FIG. 1 is a perspective illustration of a shipping carton in which the structure of the invention is incorporated;

FIG. 2 is an exploded perspective illustration of the various components which go together to make up the shipping carton;

FIG. 3 is a perspective illustration of the display device of FIG. 2 shown in FIG. 3 in its display position;

FIG. 4 is a transverse section of the structure of FIG. 3 taken along line 4—4 of FIG. 3 in the direction of the arrows and showing the structure on an enlarged scale as compared to FIG. 3;

FIG. 5 is a fragmentary section of the structure of FIG. 1 taken along line 5—5 of FIG. 1 in the direction of the arrows and showing the structure on an enlarged scale as compared to FIG. 1;

FIG. 6 illustrates one of the blank components of the display device of FIGS. 1-5;

FIG. 7 shows another of the blank components of the display device of FIGS. 1-5, the blank of FIG. 7 cooperating with that of FIG. 6 to provide the display device shown in FIGS. 2-4;

Figure 8:
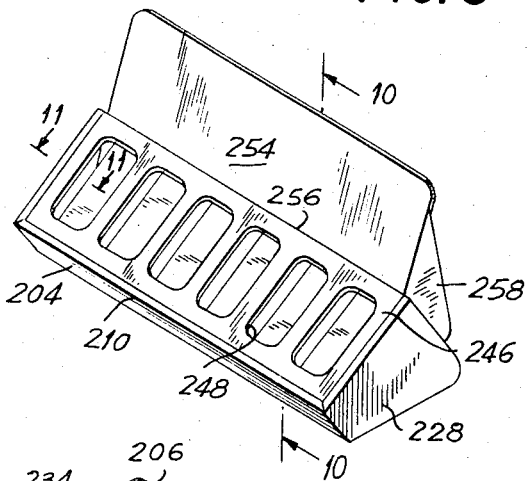
FIG. 8 is a perspective illustration of another embodiment of a display device of the invention.

Referring to FIG. 1, a shipping carton 20 is indicated therein. This shipping carton 20 is adapted to contain a relatively large number of articles such as bottles filled with a liquid, for example. The carton 20 in and of itself is substantially conventional in that it is made of a fairly rigid sheet material such as cardboard, for example. The carton 20 is made up of a lower carton portion 22 and an upper carton portion 24 fixed to the lower portion 22 by a tear tape 26 which only need be removed at the point of destination so as to release the connection between the carton parts 22 and 24. Then the upper carton part 24 can be removed so as to give access to the interior of the carton 20.

As may be seen from FIG. 2, the interior of the carton is adapted to accommodate a display means 28 of the present invention. This display means 28 is shown in its shipping condition in FIG. 2. The interior of the carton is also adapted to accommodate a partition means 30 which divides the interior of the container into compartments adapted respectively to receive the several articles. This partition means 30, however, terminates short of one of the side walls 32 of the carton. It extends substantially all the way across the carton between a pair of opposed side walls 34 thereof, however. As may be seen from FIG. 5, the carton includes a bottom wall 36 from which the side walls 32 and 34 of the carton extend in an upward direction. The partition means 30, as indicated at the lower portion of FIG. 2, terminates in free edges 38 which are short of the side wall 32 of the carton, so that in this way there is defined between the side wall 32 and the edges 38 of the partition means 30 a space which is adapted to receive the display means 28 of the invention, and it will be noted in the region of its edges 38 the partition means 30 forms a row of compartments which are open at their ends directed toward the wall 32, so that this row of open compartments will be closed by the display means 28. The manner in which this display means 28 of the present invention is accommodated in the space within the carton 20 is described in greater detail below.

Referring now to FIGS. 2–4, it will be seen that the display means 28 includes a back wall 40 and a bottom wall 42 projecting forwardly from the back wall 40. Also, the display means 28 of the invention includes a pair of end walls 46 which extend rearwardly from the ends of the back wall. The back wall 40 and bottom wall 42 intersect at the bottom edge 48 of the back wall 40, and this bottom edge 48 forms a rocking edge about which the display device 28 is rocked between the shipping position thereof shown in FIG. 2 and the display position thereof shown in FIGS. 3 and 4. The pair of end walls 46 have free edges 50 distant from the back wall 40 and engaging a supporting surface together with the rocking edge 48, so that it is these edges 48 and 50 which are an engagement with the supporting surface when the device 28 is set up for display. At this time the back wall 40 and the bottom wall 42 are spaced from and situated over the supporting surface at an angle, such as that indicated in FIG. 4, which is suitable for display purposes. The bottom wall 42 extends forwardly from the edge 48 by approximately a 90° angle with respect to the back wall 40, and the articles which are on display are supported by the back wall 40 and the bottom wall 42 in the manner shown in phantom lines in FIG. 4.

The above-described structure of the display means 28 of the invention is formed from a single blank made of a suitable sheet material such as cardboard, for example. The details of this blank are indicated in FIG. 7. Thus, referring to FIG. 7, it will be seen that the back wall 40 has a front layer 40a and a rear layer 40b while the bottom wall 42 has an upper layer 42a and a lower layer 42b. The front layer 40a is joined to the upper layer 42a by a fold line 48a, and the upper and lower layers 42a and 42b of the bottom wall 42 are joined by a front fold line 52 at the front edge of the bottom wall 42 which is most distant from the back wall 40. The lower layer 42b of the bottom wall is joined to the rear layer 40b of the back wall 40 by a fold line 48b. In this way a substantially rectangular portion of the single blank shown in FIG. 7 can be folded along the lines 48a and 48b as well as the line 52 so as to form a double-layered back wall and a double-layered bottom wall for the display device.

The back wall has pivotally connected thereto a supporting flap 54 shown at the lower portion of the blank of FIG. 7, and this supporting flap is adapted to swing out away from the back wall to have its lower edge 56 placed in engagement with the supporting surface when the device 28 is set up for display. This supporting flap 54 has a pair of finger openings 44 which enable the operator to conveniently grasp the supporting flap 54 and swing it out away from the back wall to the position shown in FIG. 4. The supporting flap 54 also has a pair of end flaps 58 joined to the intermediate portion of the supporting flap 54 by a pair of fold lines 59, and when the device 28 is set up for display these flaps 58 are folded forwardly from the intermediate portion of the supporting flap 54 so as to extend substantially parallel to the end walls 46 of the device 28. The rear layer 40b of the back wall 40 terminated in a free edge 60 which forms an extension of a fold line 62 along which the supporting flap 54 is pivotally connected with the back wall 40. This fold line 62 together with the free edge 60 coincides with an opposed free edge 64 of the blank shown in FIG. 7, and it is this edge 64 which forms the upper free edge of the front layer 40a of the back wall 40 of the display device. The device includes a tongue-and-slot means for holding the end portions 58 of the supporting flap 54 in their position extending forwardly from the intermediate portion of the supporting flap. This tongue-and-slot means includes the tongues 66 projecting from the upper inclined edges of the supporting flap 54, in their positions extending forwardly from the intermediate portion of the supporting flap, and received in the slots 68, respectively which extend through the rear layer 40b of the back wall.

The front layer 40a of the back wall 40 has a pair of end flaps 70 connected to side edges of the front layer 40a along fold lines 72 indicated in FIG. 7. From these fold lines 72 the end flaps 70 are first folded forwardly so as to provide a pair of side walls 73 extending forwardly from the back wall 40 and upwardly from the bottom wall 42 of the device 28. Then these end flaps 70 are folded rearwardly along the fold lines 74 indicated in FIG. 7. These fold lines 74 form the front edges of the side walls 73, and the rearwardly extending outer parts of the end flaps 70 terminate in inclined edges 76 which coincide with the edges 50 of the end walls 46. When the end flaps 70 are folded into the condition shown most clearly in FIG. 2 they are fixed to the end walls 46 as by being glued or stapled thereto, for example, and thus the exterior exposed surfaces of the end flaps 70 provide the display means 28 of the invention with smooth, uninterrupted exterior surfaces at its end walls.

The forwardly extending walls 73 are connected with tabs 78 along fold lines 79 indicated in FIG. 7. When the blank of FIG. 7 is folded to form the display device of the invention these tabs 78 are situated between the layers 42a and 42b of the bottom wall 42.

The blank of FIG. 7 is completed by three slots 80a formed in the front layer 40a of the back wall and coinciding with three slots 80b formed in the back layer 40b of the back wall 40, and these slots form part of a tongue-and-slot connecting structure for a purpose described below. In addition, the rear layer 40b of the back wall 40 is formed with a pair of additional slots 82 also forming part of a tongue-and-slot connection for a purpose described below.

The display means 28 of the invention has a front wall 84 indicated in FIG. 3. This front wall 84 is situated forwardly of and extends parallel to the back wall 40 to define with the latter a space in which articles are adapted to be accommodated. The front wall 84 forms part of a blank or unit having the configuration shown in FIG. 6 and being separate from but connected to the remaining structure. This front wall 84 is formed with a plurality of openings 86 through which the articles on display will be visible, and in accordance with one of the features of the invention these openings 86 are smaller than the articles so that while portions of the articles, such as labels thereof, will be visible, the articles themselves cannot be removed through the openings 86.

As is apparent from FIG. 6, the front wall 84 terminates in a pair of end flaps 88 and a bottom flap 90, and these flaps 88 and 90 are adapted to be folded rearwardly from the side and bottom edges of the front wall 84. The end flaps 88 become located along the inner surfaces of the end walls 73 while the bottom flap 90 becomes located on the bottom wall 42.

The device 28 also includes partitions 92 which extend between the front wall 84 and the back wall 40 so as to define therewith compartments which are adapted to receive the articles. These partitions 92 are integral with the front wall 84 and connected thereto along fold lines 94 situated along the right edges of the three openings 86 which are situated to the left of the right opening 86 of FIG. 6. Thus, when the parts are assembled the partitions 92 will be folded rearwardly along the fold lines 94 so as to project rearwardly from the front wall 84. The partitions 92 terminate at their rear edges in rearwardly extending tongues 96 which respectively pass through the coinciding slots 80a and 80b of the front and rear layers of the back wall 40, so that in this way a tongue-and-slot connection is formed between the blank of FIG. 6 and the blank of FIG. 7, while at the same time the partitions 92 are held in their proper position extending between the front wall 84 and the back wall 40 of the display means 28.

This display means 28 further includes a display flap 98 which is connected by a fold line 100 with the front wall 84 along an upper edge of the latter, and when the device 28 is in its shipping condition shown in FIG. 2 the display flap 98 is folded down in front of the front wall 84 so as to cover the openings 86 thereof. When the device is set up for display, as shown in FIGS. 3 and 4, however, the display flap 98 is turned up to the position shown in FIGS. 3 and 4.

The display flap 98 terminates at its opposed side edges in a pair of fastening tabs 102 connected to the display flap 98 along the fold lines 104 indicated in FIG. 6. When the device 28 is in its shipping condition these fastening tabs 102 are folded in front of the display flap 98 and they include fold lines 106 which are at the elevation of the fold line 100 and along which extensions of the tabs 102 are folded downwardly in a manner indicated most clearly in FIG. 2, so that in this way the device 28 is collapsed for shipping purposes. The extensions of the fastening tabs 102 which project beyond the fold lines 106 thereof are formed with notches 108, and along the lower edges of the notches 108 these fastening tabs have tongues 110 which are respectively received in the slots 82 when the device is set up for display purposes. The upper edge of the back wall 40 is received in the notches 108 and the tongues 110 are placed in the slots 82 so that in this way the display flap 98 will be retained in its display position shown in FIGS. 3 and 4. The front surface of the display flap 98, visible in FIG. 3, may contain any suitable printed matter.

Thus, the pair of blanks shown in FIGS. 6 and 7 are adapted to be assembled in the manner described above so as to form the display means 28 which can be collapsed to the condition shown in FIG. 2 for shipping purposes. The partition means 30 defines compartments which accommodate a considerable number of the articles 112, which may be bottles containing any desired material. In the space between the side wall 32 of the carton 20 and the edges 38 of the partition means 30 is situated the device 28 in the manner shown most clearly in FIG. 5. The compartments defined between the front wall 84, back wall 40 and the partitions 92 extending therebetween receive additional articles 112 so that the space within the carton 20 which receives the display means 28 of the invention is used for additional articles 112 which are accommodated in this space. Thus, when the entire assembly is shipped there is practically no space wasted because of the presence of the display device 28. The end walls 46 together with the end flaps 70 are received between the opposed side walls 34 of the carton and the partition means 30, as is apparent from FIG. 5.

When the device reaches its point of destination, the tear tape 26 will be removed and the upper portion 24 of the carton will be raised away to give access to the interior of the carton. Then the display means 28 will be raised out of the carton, and it will be noted that the articles 112 safely rest on the bottom wall 42 at this time. Now all that is required is to rock the device 28 above its rocking edge 48 so that it will have the display position indicated in FIGS. 3 and 4. At this time the device 28 will rest on the edges 48 and 50. Before setting the device up for display, however, the operator will turn the rear supporting flap 54 away from the back wall, placing the tongues 66 respectively in the slots of 68. After the device has been set up in this way the operator can turn the display flap 98 up to the position indicated in FIGS. 3 and 4, and the fastening tabs 102 can have their tongues 110 placed in openings 82. These are the only operations required to set the device 28 up for display purposes, and the front faces of the articles 112 will be visible through the openings 86. However, the articles 112 extend beyond the openings 86, and cannot be removed therethrough. The compartments in which the articles 112 are located have open top ends situated between the front wall 84 and the back wall 40, and it is only through these open top ends, from the rear of the device when set up for display, that the articles 112 can be removed, so that in this way possible theft of the articles by easy removal thereof through the openings 86 is avoided.

Another embodiment of a display device according to the invention is illustrated in FIGS. 8–15. The display device 200 is shown in its shipping condition in FIG. 9 and in its display position in FIGS. 8 and 10. As is apparent from FIG. 9, the display means 200 can be accommodated in a shipping carton in precisely the same way as the display means 28, and therefore the arrangement of the device 200 within a shipping carton and the manner in which it is removed therefrom are not described or illustrated inasmuch as these features are precisely the same as those described above in connection with the device 28.

Figure 13:
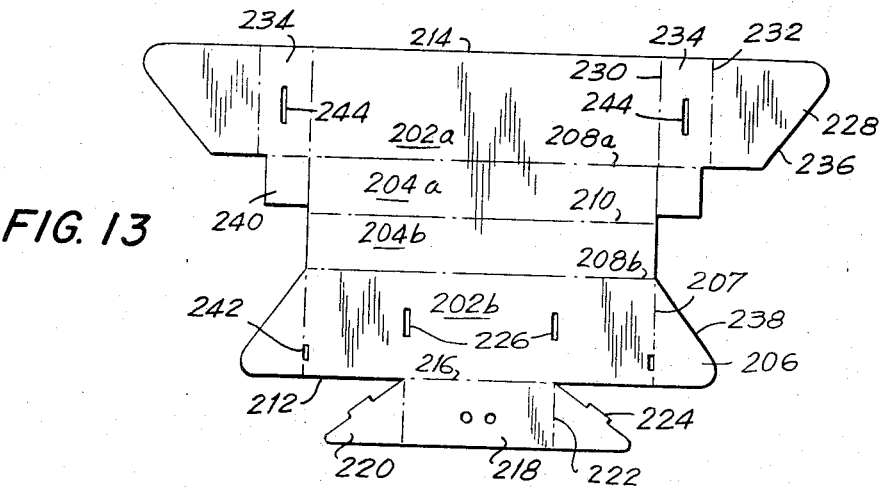
FIG. 13 shows the configuration of another blank component of this device.

This display means 200 of the invention also includes a back wall 202 and a bottom wall 204 as well as a pair of end walls 206, in precisely the same way as the device 28. Referring to FIG. 13, it will be seen that this part of display 200 is formed from a single blank the details of which are shown in FIG. 13.

Thus, as may be seen from FIG. 13, the back wall has a front layer 202a and a back layer 202b, while the bottom wall has an upper layer 204a and a lower layer 204b. The end walls 206 extend from the ends of the rear layer 202b and are connected thereto by suitable fold lines 207.

The back wall 202 and the bottom wall 204 intersect along a rocking edge 208 situated at the bottom of the back wall 202, and this edge includes the fold line 208a formed between the front layer 202a of the back wall and the upper layer 204a of the bottom wall. The layers 204a and 204b of the bottom wall are connected by a fold line 210 which forms the front free edge of the bottom wall, and the bottom layer 204b is connected by a fold line 208b to the rear layer 202b of the back wall 202.

Figure 10:
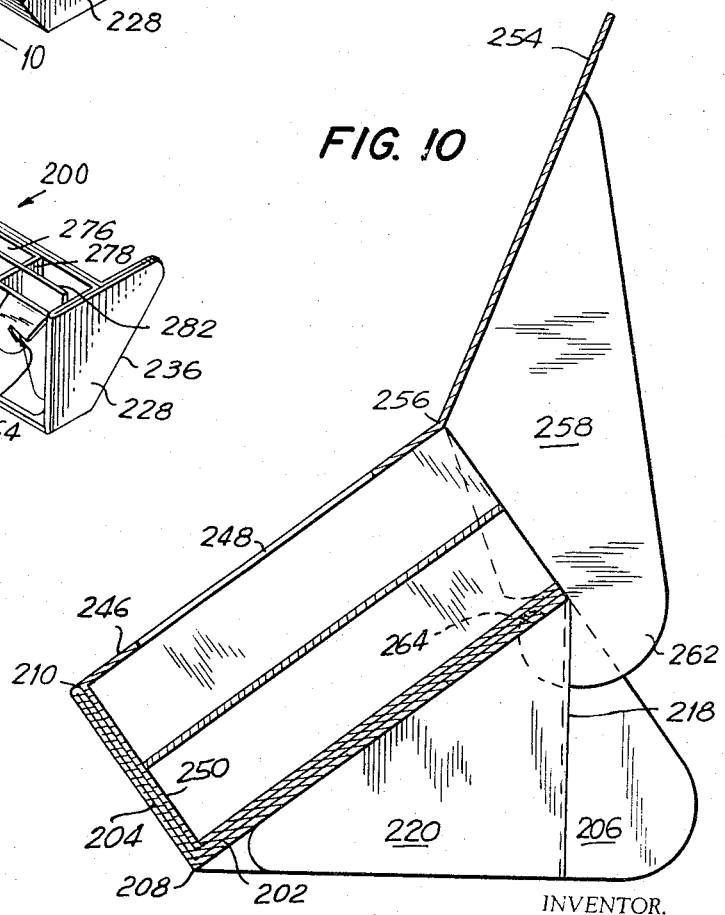
FIG. 10 is a transverse section of the display device of FIG. 8 taken along line 10—10 of FIG. 8 in the direction of the arrows and showing the structure on an enlarged scale as compared to FIG. 8.

This rear layer 202b terminates in a free edge 212 which extends along and coincides with a free edge 214 at the upper end of the front layer 202a of the back wall 202. Along a fold line 216 which forms an extension of the free edge 212 of the rear layer 202b, the blank has a supporting flap 218 pivotally connected with the back wall in precisely the same way as the supporting flap 54 described above. This supporting flap 218 will of course be swung away from the back wall to participate in the support of the device when it is set up for display, as indicated in FIG. 10. At its ends the supporting flap 218 has forwardly projecting portions 220 connected by fold lines 222 to the intermediate portion of flap 218, and these end portions 220 have along their inclined upper edges tongues 224 respectively received in slots 226, formed in the rear layer 202b of the back wall 202, when the device is set up for display in the manner indicated in FIG. 10.

The front layer 202a of the back wall 202 has end flaps 228 connected by the fold lines 230 to the front layer 202a, and these end flaps extend forwardly from the fold lines 230 so as to provide the device with a pair of end walls 234 extending forwardly from the back wall and upwardly from the bottom wall 204. These end walls 234 terminate at their front ends in the fold lines 232 from which the end flaps 228 are rearwardly folded to be joined to the end walls 206 by suitable staples, glue, or the like, in the same way as pointed out above in connection with the device 28. The flaps 228 terminate in inclined edges 236 which coincide with the edges 238 of the end walls 206, so that these edges 236 and 238 engage the supporting surface together with the rocking edge 208 when the device is set up for display purposes.

The end walls 234 which extend forwardly from the back wall 202 have lower extensions 240 in the form of tabs which are received between the layers 204a and 204b of the bottom wall.

Finally, the blank of FIG. 13 is completed by a pair of slots 242 which form part of a tongue-and-slot means for fixing the display flap of this embodiment in its display position, as will be apparent from the description below. Also, the forwardly extending end walls 234 are formed with slots 244 which form part of a tongue-and-slot connection for a purpose described below.

The display means 200 includes a front wall 246 situated forwardly of and extending parallel to the back wall 202, and this front wall 246 extends upwardly from the front edge 210 of the bottom wall 204 and is formed with a plurality of openings 248 through which the articles on display will be visible. This front wall 246 has a bottom flap 250 extending rearwardly and resting on the bottom wall 204 and a pair of end flaps 252 which extend along and engage the end walls 234.

In addition, as is apparent from FIGS. 8–10 and 12, the display means 200 includes a display flap 254 connected to the front wall 246 along the fold line 256 at the upper edge of the front wall 246, and at its ends the display flap 254 is connected by suitable fold lines with a pair of fastening tabs 258 formed with notches 260 in its extensions 262. These notches 260 receive the upper portions of the front and rear layers of the back wall 202 when the device is set up for display purposes, and it is these portions 262 which are formed at the lower edge of the notches 260 with the tongues 264 respectively received in the slots 242 for the purpose of releasably fixing the display flap 254 in the condition indicated in FIGS. 8 and 10. When the device 200 is in its shipping condition shown in FIG. 9, the display flap 254 is folded down in front of the front wall 246 so as to cover the openings 248 thereof, and the fastening tabs 258 are folded in front of the display flap 254 with the extensions 262 thereof folded down in the manner indicated most clearly in FIG. 9.

Figure 11:
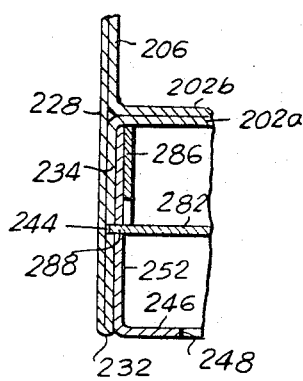
FIG. 11 is a fragmentary section taken along line 11—11 of FIG. 8 in the direction of the arrows and showing the cooperation between components of the device.
Figure 12:
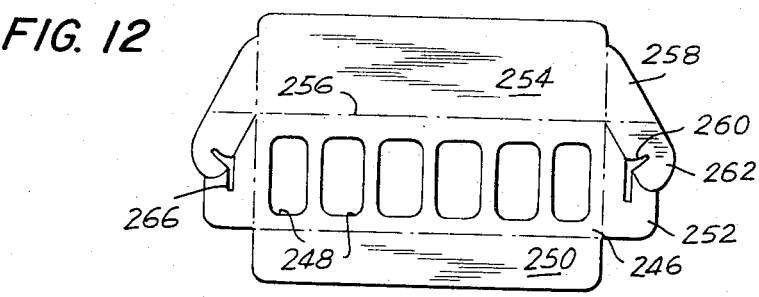
FIG. 12 illustrates the configuration of one blank component of the device of FIGS. 8–11.

As is indicated in FIG. 12, the end flaps 252 are formed with the notches 266, and these notches are aligned with the slots 244 when the parts are assembled. These latter details are shown most clearly in FIG. 11.

The partitions of the embodiment of FIGS. 8–15 are different from those of the display means 28. These partitions are formed by a pair of blanks respectively illustrated in FIGS. 14 and 15.

Figure 14:
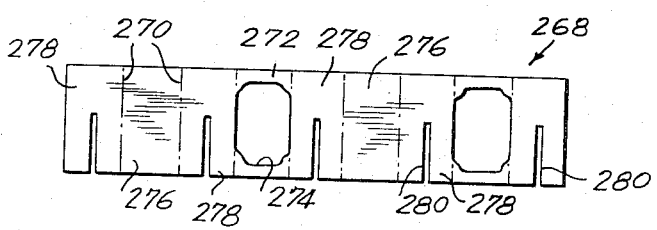
FIG. 14 shows the configuration of a further blank component of the device of FIGS. 8–11.
Figure 15:
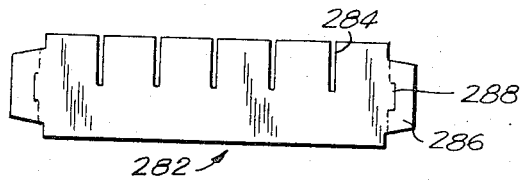
FIG. 15 shows the configuration of a fourth blank element of the device of FIGS. 8–11.

The blank of FIG. 14 includes an elongated rectangular member 268 formed with a plurality of transverse fold lines 270 which define between themselves front portions 272 which are respectively formed with openings 274 which are aligned with a pair of the openings 248. Some of the fold lines 270 also define between themselves rear portions 276 which are located along the back wall 202, in the manner shown most clearly in FIG. 9. Between these portions 272 and 276, the partition blank 268 includes the transverse portions 278 which extend between the front wall 246 and the back wall 202 so as to divide the space between these front and back walls into compartments, and it is these transversely extending partition portions 278 which are respectively formed with the notches 280 shown in FIG. 14.

The partition structure includes an intermediate partition wall 282 which extends between and is parallel to and spaced from the front wall 246 and the back wall 202, and this intermediate partition wall 282 is formed with a series of notches 284. These notches are interlocked with the notches 280 so that the notches 284 receive portions of the blank 268 which are aligned with but extend beyond the notches 280 while the notches 280 receive portions of the blank 282 which are aligned with but extend beyond the notches 284, and in this way the parts are assembled to form two rows of compartments as indicated in FIG. 9.

Figure 9:
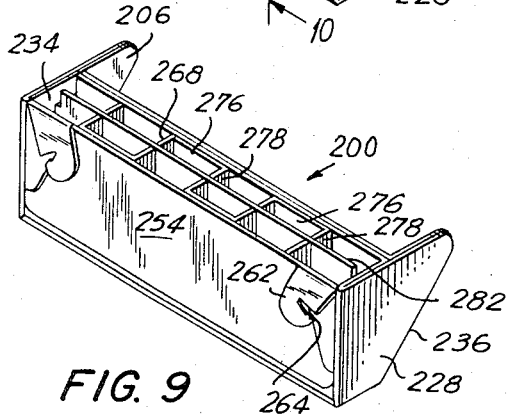
FIG. 9 shows the display device of FIG. 8 in its shipping position.

The intermediate partition wall 282 terminates in a pair of end flaps 286 which are adapted to be folded rearwardly to become situated against the rearwardly extending flaps 252 at the ends of the front wall 246, and along the fold lines which connect the flaps 286 to the ends of the blank 282, this blank is formed with the tongues 288 which extend at each end of the device through a notch 266 and into a slot 244, in the manner shown most clearly in FIG. 11, so that in this way these tongues 288 cooperate with the notches 266 and the slots 244 in order to form a tongue-and-slot connection maintaining the parts assembled in the condition indicated in FIG. 9.

It will be noted that with this embodiment also the compartments for the articles are open only at their top ends while the openings 248 are small enough to prevent removal of the articles through the openings 248 in the front wall 246. Therefore, with this embodiment also the articles can only be removed through the open top ends of the compartments.

What is claimed is:

1. For use in the shipping of articles some of which are to be placed on display when the articles arrive at their destination, a shipping carton having a bottom wall and a plurality of side walls extending upwardly therefrom, partition means in said carton dividing the interior thereof into a plurality of compartments respectively adapted to receive articles, said partition means terminating short of one of said side walls and having at its end nearest to said one side wall a row of compartments which respectively have open ends directed toward said one side wall, said partition means extending substantially all the way across said carton between a pair of opposed side walls thereof which extend from said one side wall, so that said partition means defines in the interior of said carton a given space with said one side wall thereof, and display means situated in said space and supporting at least some of the articles in said space during shipment of the articles in said carton, said display means closing said open ends of said row of compartments of said partition means, and said display means together with the articles supported thereby being removable from said space in said carton for placing the articles supported by said display means on display when the carton arrives at its destination.

2. For use in the shipping of articles some of which are to be placed on display when the articles arrive at their destination, a shipping carton having a bottom wall and a plurality of side walls extending upwardly therefrom, partition means in said carton dividing the interor thereof into a plurality of compartments respectively adapted to receive articles, said partition means terminating short of one of said side walls and extending substantially all the way across said carton between a pair of opposed side walls thereof which extend from said one side wall, so that said partition means defines in the interior of said carton a given space with said one side wall thereof, and display means situated in said space and supporting at least some of the articles in said space during shipment of the articles in said carton, said display means together with the articles supported thereby being removable from said space in said carton for placing the articles supported by said display means on display when the carton arrives at its destination, said display means including a back wall engaging said partition means and defining with said one side wall of said carton a space in which some of the articles are located during shipment in said carton, a bottom wall projecting forwardly from said back wall and situated directly over and against said bottom wall of said carton, the articles in the space between the said back wall of said display means and said one side wall of said carton resting on said bottom wall of said display means during shipment of the latter articles in said carton, and said bottom wall and back wall of said display means intersecting at a rocking edge of sid display means, said display means further including a pair of end walls extending rearwardly from said back wall of said display means and situated between said partition means and said pair of opposed side walls of said carton, respectively, during shipment of heavy articles with the display means in the interior of said carton, said end walls terminating distant from said back wall in parallel elongated free edges intersecting said rocking edge at a predetermined angle so that when the carton reaches its desination and is opened, said display means can be removed from said carton and can be rocked about said rocking edge until said free edges of said end walls engage a given supporting surface together with said rocking edge, thus situating said back wall of said display means at an angle suitable for display purposes while articles supported by said display means rest on said bottom wall thereof which is spaced from the support-surface to maintain the articles substantially in their original relationship with respect to said back wall of said display means.

3. The combination of claim 2 and wherein said free edges of said end walls define with said back wall an angle between 0° and 90°.

4. The combination of claim 2 and wherein a supporting flap is pivotally connected with said back wall of said display means at a top edge of said back wall and during location of said display means in said shipping carton is situated between said back wall and said partition means, said supporting flap swinging away from said back wall and terminating in a free edge which also engages said supporting surface to support the display means simultaneously with the free edges of said end walls thereof.

5. The combination of claim 2 and wherein display means includes a front wall parallel to said back wall thereof and situated next to said one side wall of said carton when said display means is located therein during shipment of the articles, so that the articles carried by said display means are situated between said front and back walls thereof, said display means further including partitions extending between said front and back walls thereof to form compartments for the articles supported by said display means, and said front wall of said display means being formed between said partitions of said display means with openings through which articles supported by said display means are visible when said display means is removed from said carton and placed on a supporting surface.

6. The combination of claim 5 and wherein said openings of said front wall are smaller than the articles so that the articles cannot be removed through said front wall openings.

7. The combination of claim 5 and wherein said display means includes a display flap pivotally connected to said front wall at a top edge thereof and turnable to a display position when said display means rests with the rocking edge and free edges of said end walls thereof on a supporting surface, said display flap carrying at least one fastening tab which is fastened to said back wall of said display means when said display flap is turned to said display position.

8. The combination of claim 7 and wherein said fastening tab is turnably connected with said display flap and wherein both said fastening tab and said display flap are situated between said one side wall of said carton and said front wall of said display means when the latter is situated in said carton during shipment of the articles.

9. The combination of claim 5 and wherein said partitions are fixed to said front wall and respectively have tongue-and-slot connections with said back wall for fixing said front wall thereto, said partitions defining between said front and back walls of said display means a single row of compartments which will accommodate articles and which have open top ends through which the articles can be removed.

10. The combination of claim 5 and wherein said display means includes an intermediate partition wall situated substantially midway between said front and back walls parallel thereto and intersecting said partitions to define two rows of compartments therewith for supporting articles in said display means, said latter compartments having open top ends through which the articles can be removed and said intermediate partition wall terminating at its ends in tongue-and-slot connections with said end walls of said display means for connecting not only said intermediate partition wall but also said partitions to said display means, and said front wall terminating at its ends in flaps extending rearwardly to said back wall alongside of said end walls and also having tongue-and-slot connections with said ends of said intermediate partition wall, so that the latter also connects said front wall to said end walls.

11. A display device comprising a back wall, a bottom wall fixed to and projecting forwardly from said back wall at a bottom edge thereof at substantially right angles to said back wall so that said back and bottom walls can form a support for articles which are to be displayed, said bottom edge of said back wall forming a rocking edge about which said walls can rock to a display position where both of said walls are spaced from and situated over a supporting surface on which said rocking edge rests, and said bottom wall being adapted to engage the bottom wall of a shipping carton in which the display device is located during shipment of articles together with the display device, and a pair of end walls fixed to and extending rearwardly from said back wall at ends thereof and terminating distant from said back wall in free edges, respectively, which are parallel to each other and which engage a supporting surface together with said rocking edge for supporting said display device in a display position where said back and bottom walls are spaced above the supporting surface, and a front wall forming part of a unit separate from said back, bottom, and end walls and removably connected with the latter walls in the position extending parallel to and spaced from said back wall.

12. A display device as recited in claim 11 and wherein said back, bottom and end walls all form part of a single blank and wherein said front wall forms part of a second blank.

13. The device of claim 12 and wherein said back wall has front and rear layers and said bottom has upper and lower layers, said front layer of said back wall having a free top edge and having a bottom edge joined at a fold line to said upper layer of said bottom wall, said bottom wall upper layer having distant from said back wall a front edge joined by a fold line to said lower layer of said bottom wall and said lower layer of said bottom wall terminating at its rear end in an edge joined by a fold line to said rear layer of said back wall.

14. The device of claim 13 and wherein a supporting flap is joined by a fold line to an upper edge of said rear layer of said back wall which is coextensive with said free top edge of said front layer of said back wall.

15. The device of claim 13 and wherein said front layer of said back wall has connected to its opposed side edges a pair of end flaps each of which extends forwardly from said front layer of said back wall up to said front edge of said bottom wall and then rearwardly into co-extensive covering relationship with one of said end walls.

16. A display device comprising a back wall, a bottom wall extending forwardly from a bottom edge of said back wall, and a pair of end walls extending both forwardly and rearwardly of said back wall to define with said back and bottom walls a front space which is open at its front and top ends and said end walls terminating rearwardly of said back wall in free edges on which the device is adapted to rest with said bottom edge of said back wall forming a rocking edge about which the device can be rocked between a shipping position where said bottom wall rests on the bottom wall of a shipping carton with the device situated in the interior thereof and a display position where the device rests on said free edges of said end walls and on said rocking edge with said back and bottom walls forming part of a unit separate from but connected to said back, bottom, and end walls and raised above a supporting surface engaged by said edges, a front wall extending parallel to said back wall and upwardly from a front edge of said bottom wall to define with said back wall a space in which articles are adapted to be located, a plurality of partitions extending between said front and back walls to define compartments in the latter space in which articles are adapted to be located, respectively, said front wall being formed with openings situated between said compartments so that the articles therein will be visible through said openings, and a display flap connected by a fold line to a top edge of said front wall and adapted to be turned with respect thereto to a display position where a front face of said display flap is visible and said openings are uncovered by said display flap, said display flap terminating at opposed side edges in a pair of fastening tabs respectively having tongue-and-slot connections with said back wall for releasably holding said display flap in said display position thereof.

17. The device of claim 16 and wherein a tongue-and-slot means connects said partitions to one of the walls other than said front wall.

18. The device of claim 17 and wherein said partitions are integral with said front wall and have said tongue-and-slot connections with said back wall.

19. The device of claim 16 and wherein said partitions include a zig-zag insert situated between said front and back walls and defining one set of compartments and an intermediate partition wall intersecting said insert and defining with the latter two rows of compartments between said front and back walls, said intermediate partition walls being parallel to said front and back walls and having at its ends tongue-and-slot connections with said end walls.

20. The device of claim 16 and wherein said openings of said front wall are smaller than the articles so that the latter are visible through said openings but cannot be removed therethrough, said compartments defined between said front and back walls having open top ends through which the articles can be removed.

References Cited

UNITED STATES PATENTS

| 1,408,814 | 3/1922 | List | 206—45.29 |
| 1,490,215 | 4/1924 | Kaufman | 206—45.29 |
| 1,625,687 | 4/1927 | Ryan et al. | 206—45.29 |
| 1,911,995 | 5/1933 | Gaffney | 206—45.25 |
| 3,167,179 | 1/1965 | Goldstein | 206—44 |

THERON E. CONDON, *Primary Examiner.*

WILLIAM T. DIXSON, JR., *Examiner.*